Sept. 6, 1960 G. REZEK ET AL 2,951,652

TAPE REELING MACHINE

Filed Nov. 14, 1955

INVENTORS.
Gerard Rezek &
Charles J. McBrerty
BY Morris L. Rabkin
ATTORNEY.

United States Patent Office 2,951,652

Patented Sept. 6, 1960

2,951,652

TAPE REELING MACHINE

Gerard Rezek and Charles J. McBrerty, Collingswood, N.J., assignors to Radio Corporation of America, a corporation of Delaware Filed Nov. 14, 1955, Ser. No. 546,455

6 Claims. (Cl. 242—55.12)

This invention relates to tape strippers for tape reeling machines, and it has for its object to provide a simple and efficient stripping device for keeping a tape taut on a reel when it is either winding or unwinding.

Another object of the invention is to provide a novel and improved self-aligning pressure roller mechanism cooperating with a capstan to frictionally drive, and alternatively to brake, the tape in a machine of the above type.

Various other objects and advantages will be apparent as the nature of the invention is more fully disclosed.

The invention is applicable to various machines, such as tape recorders, paper tape transcribers, etc., in which a tape is unwound from one reel and wound up on another reel. In a machine of this type, whichever reel is doing the unwinding at any given time is usually called the pay-out reel, while the other one is referred to as the take-up reel.

The tape stripper of the present invention, when used in a tape machine of the above type, pulls the tape off the pay-out reel and advances it so that it may be taken up by the take-up reel. Since the two reels function interchangeably as pay-out and take-up reels, two of our tape strippers are employed in a machine of the type specified, and a feature of the invention resides in the high efficiency with which these devices keep the tape taut on the reels when they are either winding or unwinding. By keeping the tape taut in this manner, mechanism for advancing the tape is isolated forcewise from each tape reel; that is, no forces to keep the tape taut are transferred into the advancing mechanisms.

Our tape stripper comprises a rotatable capstan and a pressure roller which exerts a uniform pressure over the entire width of the tape to hold it in frictional engagement with the capstan at all times. Through the intermediary of a special arrangement of clutches hereinafter described, the capstan is rotatable in only one direction, namely, in a direction to pull the tape off the associated reel when the latter is serving as the pay-out reel. On the other hand, when the same reel rotates in the opposite direction to wind the tape, the clutch mechanism locks the capstan against rotation and it then serves as a fixed friction surface which, with the cooperation of the pressure roller, keeps the tape taut while it is being wound up on said reel.

The invention is described more in detail in connection with the accompanying single sheet of drawings illustrating a preferred embodiment of the invention, wherein.

Figure 1:
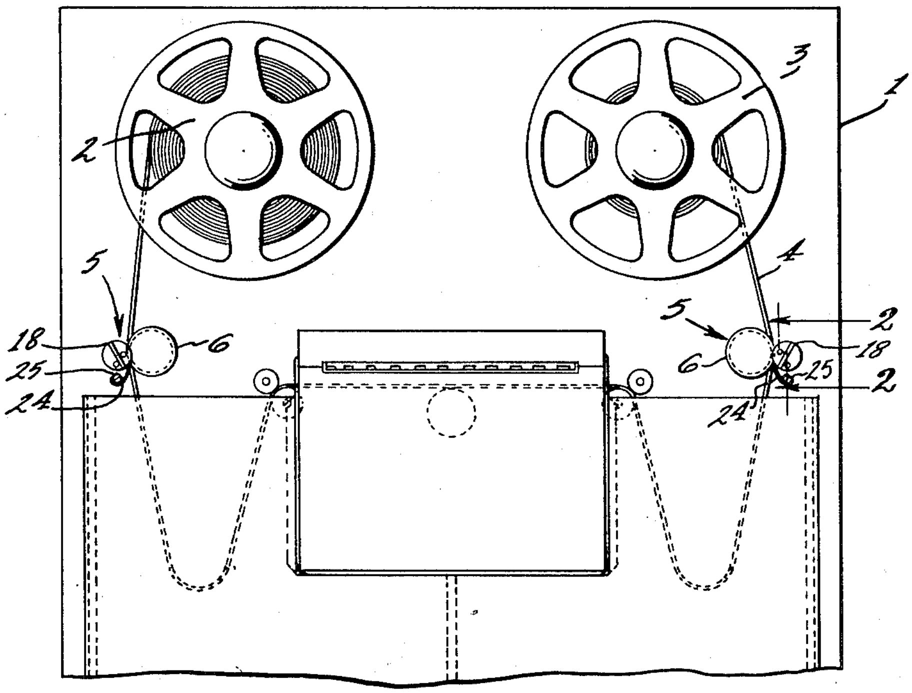
Fig. 1 is a front elevational view of a paper tape reader panel in which the tape, which is selectively wound and unwound by a pair of reels, is controlled by a pair of tape strippers embodying the present invention.

The tape reader panel 1 shown in Fig. 1 includes a pair of rotatable reels 2 and 3 for winding and unwinding the tape 4. The reels are rotated in either direction by suitable driving mechanism, not shown. When both reels rotate in a clockwise direction in Fig. 1, the tape 4 unwinds from reel 3 and is wound up on reel 2; and when both reels rotate in a counterclockwise direction in Fig. 1, the movement of the tape is reversed. Associated with each reel on panel 1 is a tape stripper 5 the detailed construction of which is illustrated in Figs. 2 and 3.

Each of the tape strippers mounted on panel 1 includes a capstan 6 preferably made of molded nylon which has appropriate friction characteristics. The capstan has an integral hub 7 to which a shaft 8 is secured, as shown in Figs. 2 and 3. The mechanism for rotating the capstan includes pulley belt 9 and drive pulley 10 which drives the capstan shaft 8 through the intermediary of a pair of spring clutches 13 and 14, the latter of which is housed in a casing 15 mounted on panel 1.

Figure 2:
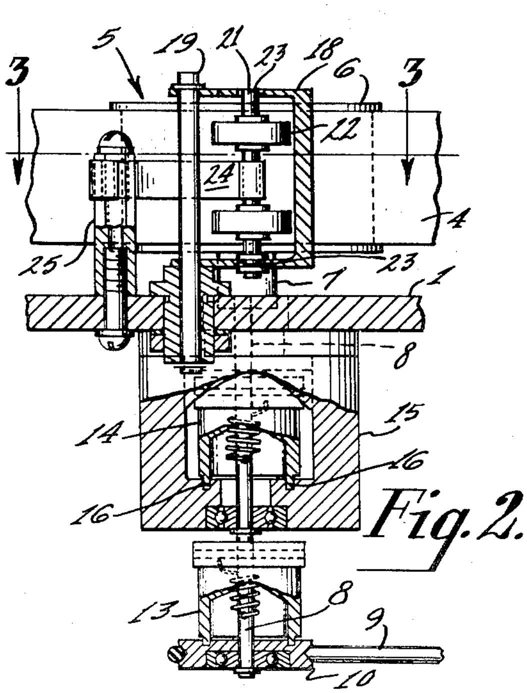
Fig. 2 is a detail sectional view taken on line 2—2 of Fig. 1, illustrating the construction of the tape stripper and self-aligning pressure roller.
Figure 3:
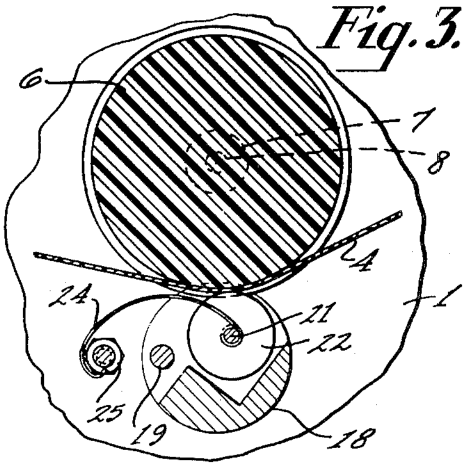
Fig. 3 is a sectional view through the capstan and pressure roller mechanisms, taken on line 3—3 of Fig. 2.

The pulley 10 is driven from the reel shaft; that is, assuming the tape stripper of Fig. 2 to be the one associated with the tape reel 3 at the right-hand side of Fig. 1, pulley belt 9 which drives pulley 10 is driven by a pulley (not shown) on the drive shaft of tape reel 3. The other tape stripper, associated with the tape reel 2 at the left-hand side of Fig. 1, is similarly driven from the drive of reel 2. In each case the ratio of the pulley (not shown) on the tape reel shaft to the pulley 10 on the capstan shaft 8 is such that the surface speed of capstan 6 is always greater than the surface speed of the tape 4 as it leaves the unwinding tape reel.

The spring clutches 13 and 14 may be of any suitable type which effect a driving relationship only in one direction of rotation of drive pulley 10. Hence, when pulley 10 is rotated in the opposite direction, it is in "free wheel." For example, when the tape reel 3 of Fig. 1 is unwinding (rotating clockwise) the drive pulley 10 of Fig. 2 is rotated by belt 9, and since pulley 10 is keyed to the first spring clutch 13, it drives the entire clutch 13 which, in turn, drives the shaft 8. Only half of the second spring clutch 14 is keyed to the shaft 8 (the other half being keyed at 16 to the casing 15 as shown in Fig. 2) and the half of the clutch which is keyed to shaft 8 now rotates and drives the capstan 6. However, when the tape reel 3 of Fig. 1 is rewinding (rotating counter-clockwise) the two halves of the second spring clutch 14 lock and connect the capstan shaft 8 to the stationary casing 15 so that the capstan cannot rotate.

Since the reel 3 unwinds by rotating in a clockwise direction in Fig. 1, while reel 2 unwinds by rotating in a counter-clockwise direction, the spring clutches of one tape stripper are wound "right-hand" while the spring clutches of the other tape stripper are wound "left-hand." As is known, when either end of a "right-hand" clutch is held stationary, the other end can be rotated clockwise but not counterclockwise, while the reverse is true of a "left-hand" clutch. Accordingly, the capstan 6 associated with reel 3 in Fig. 1 can be driven to rotate in a clockwise direction but it will not rotate in a counter-clockwise direction, while the opposite is true of the capstan associated with the reel 2.

The self-aligning roller mechanism which holds the tape 4 in frictional engagement with the capstan 6 at all times is illustrated in Figs. 2 and 3. It includes a roller carrier or support 18 freely pivoted on a shaft 19 which is mounted in a bearing bushing in panel 1 adjacent the capstan 6. A roller shaft 21, on which a pair of spaced rollers 22 are freely rotatable, has its ends loosely supported in enlarged axially-aligned holes 23 in the roller carrier 18, as shown in Fig. 2. A resilient, bowed leaf spring 24 has one of its ends secured to a post 25 mounted on panel 1, and has its other end curled about the central portion of roller shaft 21 midway between the spaced rollers 22. The spring 24 is biased to press the rollers 22 against the tape 4 and thus hold the tape in frictional engagement with the capstan 6. By having the ends of the roller shaft 21 loosely supported in the holes 23 in roller carrier 18 and applying the pressure of spring 24 at the center of said shaft 21, the pressure roller assembly is self-aligning and applies pressure equally to the two rollers 22.

It will be evident from the foregoing that when either of the reels 2 or 3 is unwinding, the associated tape stripper holds the tape taut because the capstan 6 "overdrives" compared to the speed of the tape coming from the reel. On the other hand, when the reel is winding, the associated capstan 6 is not rotating, and hence the tape is dragged over the friction surface of the capstan and, with the cooperation of the pressure rollers 22, is kept taut while it is being wound up on the reel.

What is claimed is:

1. The combination with a reel adapted to rotate alternatively in either of two directions to unwind or wind a tape, of a tape stripper comprising a capstan over which said tape is passed, means for pressing said tape into frictional engagement with said capstan operative to maintain said frictional engagement at all times during the winding and unwinding of said tape on and from said reel, a driving mechanism for said capstan including a drive shaft and means for driving said shaft in the same direction as said reel, and coupling means between said shaft and said capstan operable to connect said capstan to said shaft only when said reel rotates in an unwinding direction, said coupling means comprising a pair of spring clutches operable to couple said capstan to said drive shaft only when said reel rotates in an unwinding direction and to lock said capstan against rotation to provide a fixed friction surface for said tape when said reel rotates in a winding direction.

2. The combination of claim 1, in which the means for pressing said tape into frictional engagement with said capstan comprises a self-aligning rotatable pressure member, and means for exerting constant uniform pressure on said member to press said tape upon said capstan.

3. The combination of claim 1, in which the means for holding said tape in frictional engagement with said capstan comprises a roller carrier pivotally mounted adjacent said capstan, a roller shaft on said carrier, a pair of rollers on said shaft adapted to engage the tape on said capstan, and a spring acting on said shaft to press said rollers against the tape on said capstan.

4. The combination of claim 3, in which the ends of said roller shaft are loosely mounted in holes in said roller carrier, in which said rollers are spaced apart on said shaft, and in which said spring is a leaf spring engaging the center of said shaft between said rollers and is bowed and flexed to hold said rollers in engagement with the tape on said capstan.

5. A system for reeling an elongated, flexible medium in opposite directions between a pair of reels alternatively operative as a pay-out or a take-up reel comprising a pair of capstans, one of said capstans being disposed in the path of said medium passing directly from one of said reels, the other of said capstans being disposed in the path of said medium passing directly from the other of said reels, means for normally maintaining said medium in driving contact with said capstans, means for conjointly driving each reel with the one of said capstans disposed directly in the path of said medium passing therefrom comprising means for driving the one of said reels operative as a pay-out reel conjointly with one of said capstans such that the peripheral driving speed of said capstan is greater than the speed of said medium passing from said reel to maintain said mediums taut while unwinding from said pay-out reel, and means for driving the one of said reels operative as a take-up reel with the other of said capstans including mechanism for maintaining said other capstan stationary whereby said medium is maintained taut while winding on said take-up reel.

6. A system for reeling an elongated, flexible medium between a pair of reels comprising a support structure on which said reels are mounted, a pair of capstans mounted on said structure, each being disposed in the path of said medium passing directly from a different one of said reels, a pair of spring biased pressure rollers for normally maintaining said medium in driving contact with said capstans, means for driving each reel conjointly with the one of said capstans disposed directly in the path of said medium passing therefrom such that the peripheral driving speed of said capstan is greater than the speed of said medium passing from said reel to maintain said medium taut while unwinding from said reels, and said capstan driving means each including a mechanism providing for rotation of said capstans only in opposite senses, said mechanisms each having an element mounted on said structure and an element rotative with said capstan locking said capstan to said structure when said capstan rotates in a sense opposite to the sense to permit unwinding of said mediums from the one of said reels conjointly driven therewith whereby said medium is maintained taut while winding on said reels.

References Cited in the file of this patent

UNITED STATES PATENTS

| | | |
|---|---|---|
| 1,861,584 | Readeker et al. | June 7, 1932 |
| 2,092,159 | Hasbrouck et al. | Sept. 7, 1937 |
| 2,270,730 | Gochnauer | Jan. 20, 1942 |
| 2,364,556 | Somers | Dec. 5, 1944 |
| 2,499,699 | Tinkham | Mar. 7, 1950 |
| 2,568,339 | Jacobson | Sept. 18, 1951 |
| 2,589,660 | Bauman et al. | Mar. 18, 1952 |
| 2,612,565 | Heller | Sept. 30, 1952 |
| 2,617,706 | Jeffrey | Nov. 11, 1952 |
| 2,666,597 | Wood | Jan. 19, 1954 |
| 2,668,059 | Roberts | Feb. 2, 1954 |
| 2,705,599 | McCollough | Apr. 5, 1955 |
| 2,778,634 | Gams et al. | Jan. 22, 1957 |